April 3, 1951        I. M. HOGLIN        2,547,266
FLUID-JET-SUSTAINED AIRCRAFT
Filed Oct. 2, 1947        4 Sheets-Sheet 1
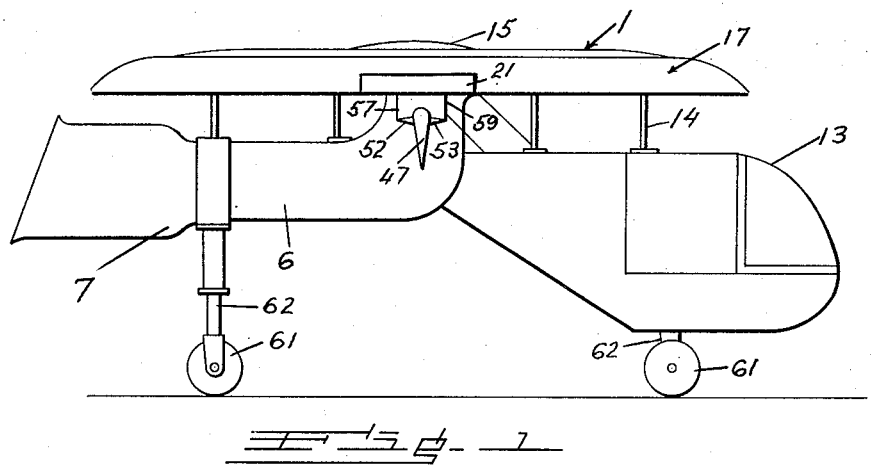
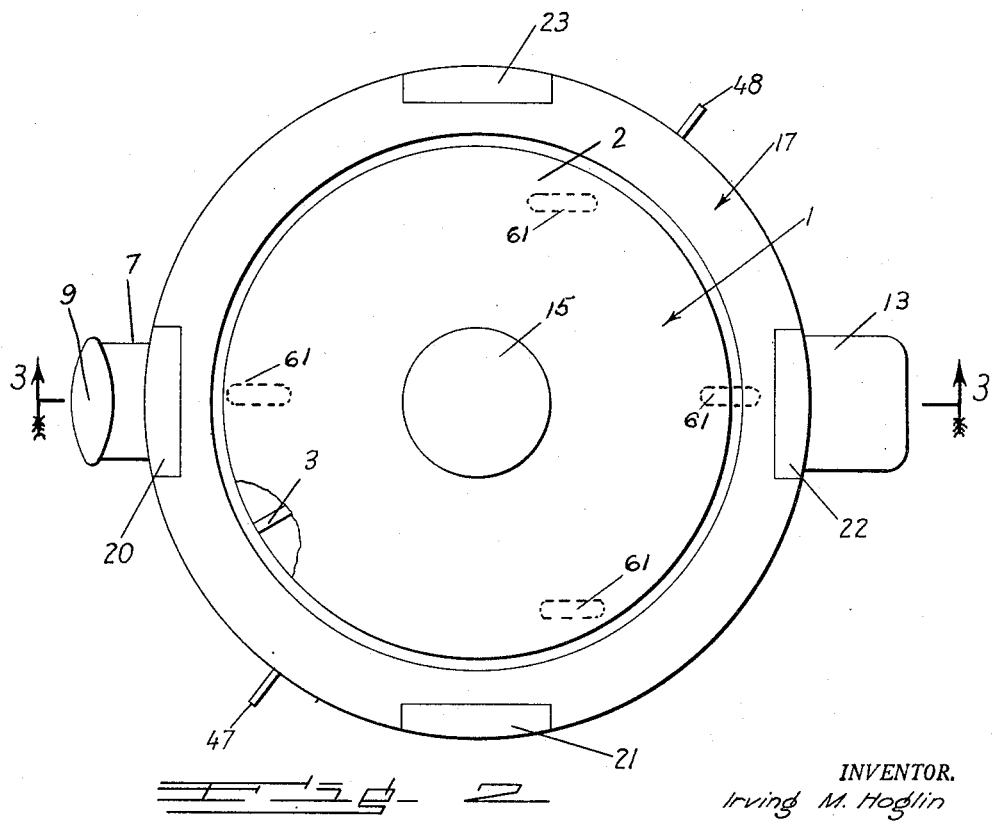
INVENTOR.
Irving M. Hoglin
BY
P. H. Lamphere
ATTORNEY April 3, 1951      I. M. HOGLIN      2,547,266
FLUID-JET-SUSTAINED AIRCRAFT
Filed Oct. 2, 1947      4 Sheets-Sheet 2
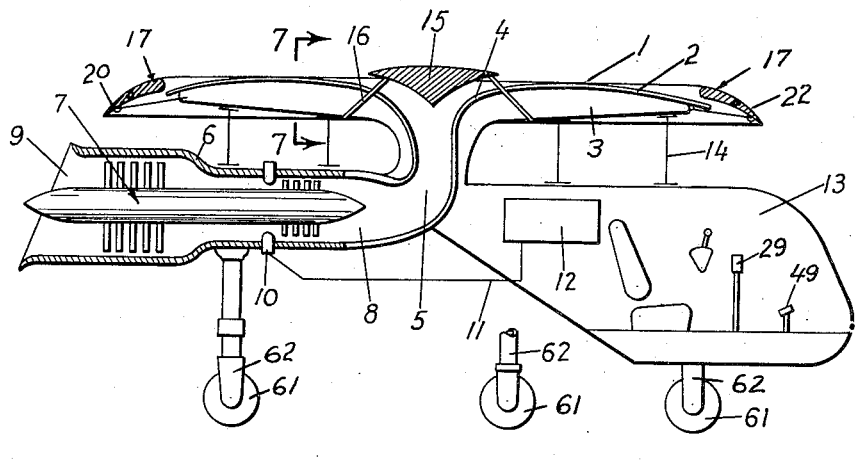
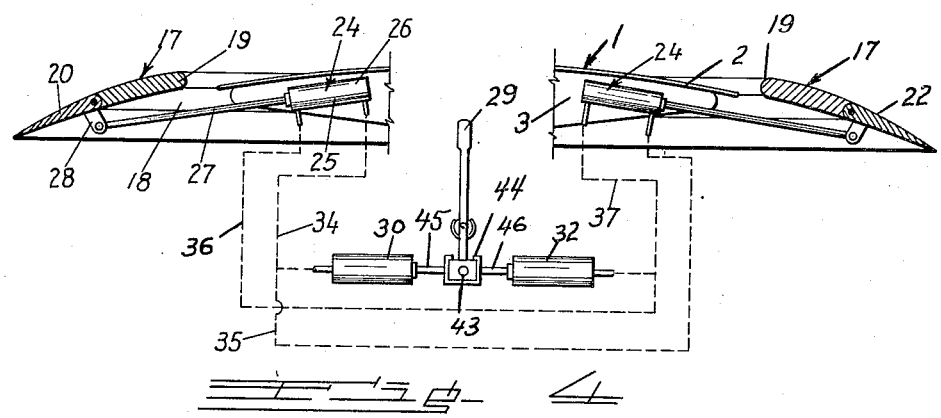
INVENTOR.
Irving M. Hoglin
BY
P. H. Lamphere
ATTORNEY April 3, 1951     I. M. HOGLIN     2,547,266
FLUID-JET-SUSTAINED AIRCRAFT
Filed Oct. 2, 1947     4 Sheets-Sheet 3
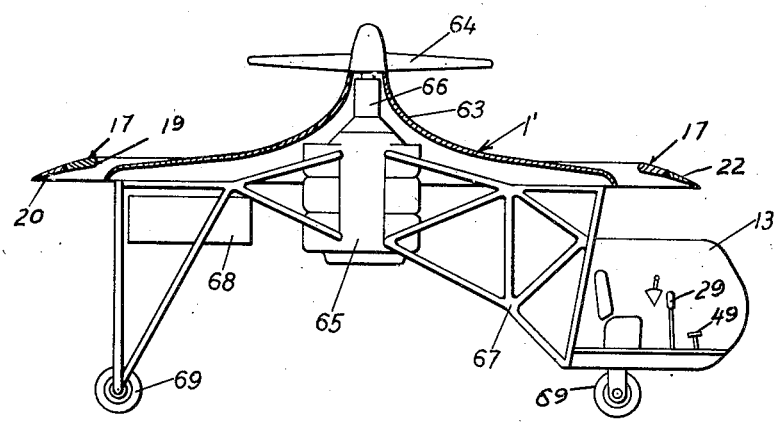
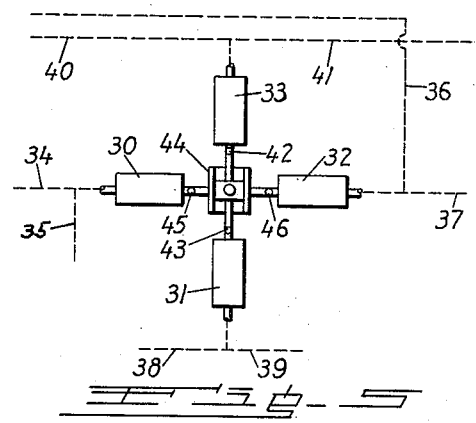
INVENTOR.
Irving M. Hoglin
BY
*P. H. Lamphere*
ATTORNEY April 3, 1951      I. M. HOGLIN      2,547,266
FLUID-JET-SUSTAINED AIRCRAFT
Filed Oct. 2, 1947      4 Sheets—Sheet 4
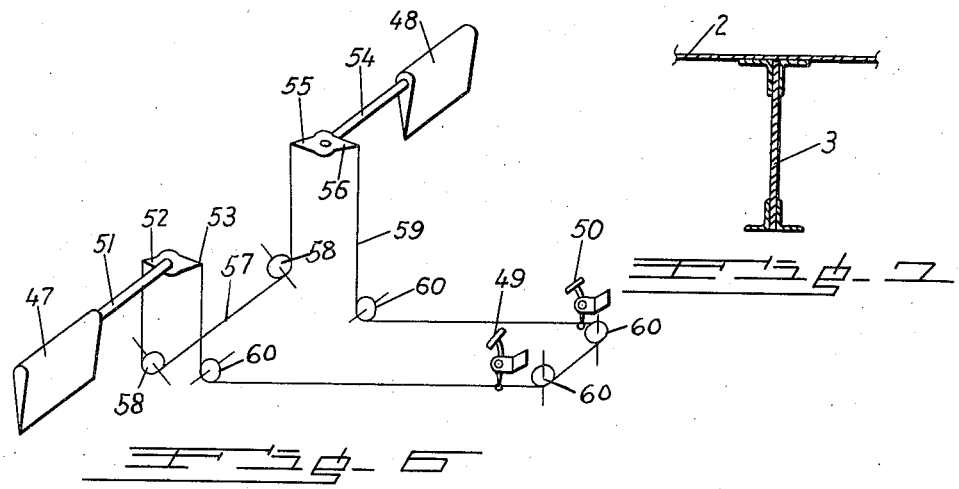
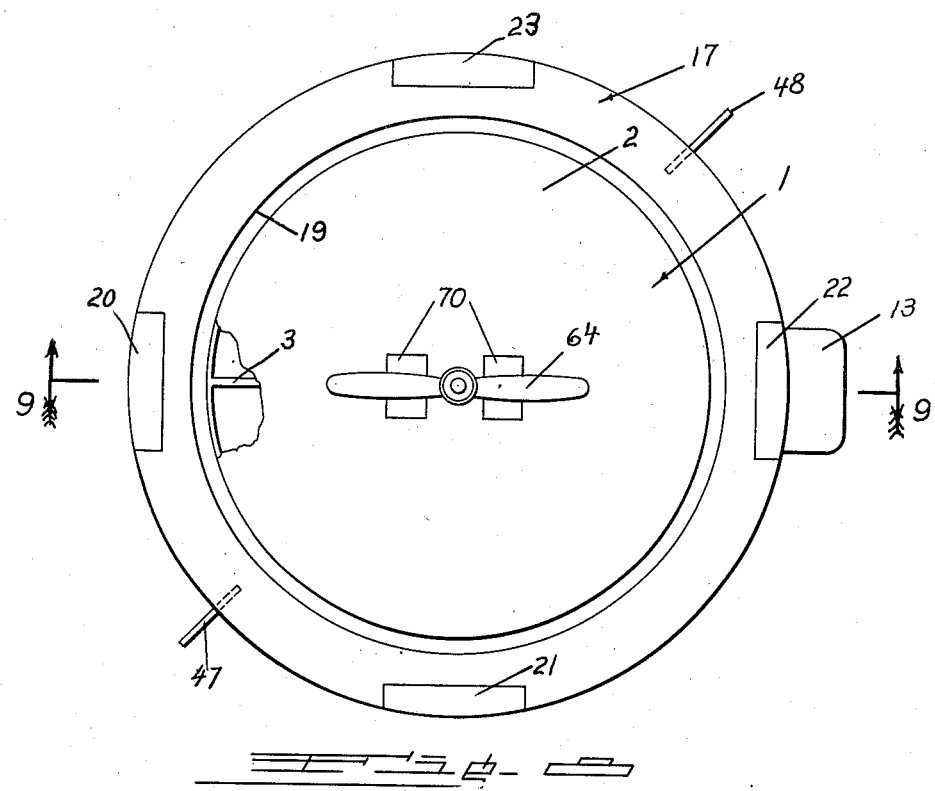
INVENTOR.
Irving M. Hoglin
BY
*P. N. Lamphere*
ATTORNEY Patented Apr. 3, 1951

2,547,266

UNITED STATES PATENT OFFICE 2,547,266

FLUID-JET-SUSTAINED AIRCRAFT

Irving M. Hoglin, Boulder, Colo.

Application October 2, 1947, Serial No. 777,464

7 Claims. (Cl. 244—12)

This invention relates to aircraft and more particularly to an aircraft employing a reaction lift principle.

In conventional aircraft, propeller thrust is employed to move the airfoil or wings through the air and thus, by this movement of the airfoil, forces will be effective on the airfoil to maintain the aircraft in the air. In helicopter aircrafts the rotation of a blade on a vertical axis maintains the aircraft in the air. In the aircraft embodying my invention an entirely different principle of maintaining the aircraft in the air is employed which I have called the reaction lift principle. This principle involves the conception of moving air, hot gases or like gaseous matter, to be hereafter generally referred to simply as a gas, over an airfoil at a very high velocity. This movement of gas in relation to the airfoil will result in a differential pressure being effective on the airfoil which will act in an upward direction, thus giving lift and sustaining the aircraft in the air.

An object of the invention is to produce an improved aircraft in which an airfoil (stationary on the aircraft) is employed and the lift thereon is obtained independently of the movement of the airfoil through the air by causing gas from a suitable source to flow thereover at a high velocity, thus decreasing the pressure on the top surface of the airfoil with respect to the pressure on the bottom surface.

Another object is to produce an aircraft wherein the lift therefor is obtained by a disk-like airfoil, a means for establishing a high velocity flow of gas and diffuser means for directing the gas to flow outwardly in all directions over the top surface of the airfoil from the central portion thereof.

Yet another object is to produce an aircraft of the type above referred to having a secondary airfoil means at the periphery of the disk-like airfoil or equivalent airfoil which will be so associated therewith that additional lift can be obtained from the high velocity flow of the gas.

A still further object is to embody in an aircraft of the type referred to, control means whereby the lift effective on different portions of the airfoil can be varied to thereby cause the aircraft to have movement other than vertical.

A further and more specific object is to produce an improved aircraft in which lift thereon is established by hot, high velocity gases from a turbo-jet engine being caused to flow at a high velocity over the top surface of an airfoil.

A further object is to control the lateral movement of a reaction lift type of aircraft by differentially changing the direction of flow on opposite surfaces of an airfoil over which gas flows from the central portion at a high velocity.

A further object is to control the direction of lateral movement of a reaction lift type of aircraft by means of diametrically positioned and simultaneously operated rudders arranged in the slip stream of the aircraft.

Other objects of the invention will become apparent from the following description taken in connection with the accompanying drawings showing aircraft embodying said invention.

In the drawings:

Figure 1 is a side view of an aircraft of the reaction lift type in which a turbo-jet engine is employed;

Figure 2 is a top view of the aircraft;

Figure 3 is a sectional view of the aircraft, said view being taken substantially on the line 3—3 of Figure 2;

Figure 4 is a view of two diametrically positioned control flaps and the actuation motors, together with a schematic side view of two of the hydraulic compressors and hand stick;

Figure 5 is a schematic plan view showing the hydraulic compressors for controlling all the flaps;

Figure 6 is a schematic view showing the manner in which the torque rudders are controlled;

Figure 7 is a sectional view taken on the line 7—7 of Figure 3 showing a detail of the main airfoil construction;

Figure 8 is a top view of another aircraft structure employing an internal combustion engine and propeller for obtaining flow of air to obtain lift; and Figure 9 is a sectional view of the aircraft of Figure 8, said view being taken approximately on the line 9—9 of Figure 8.

Referring first to Figures 1 to 7, inclusive, there is disclosed an aircraft embodying a reaction lift principle in which a turbo-jet engine is employed as the means for obtaining a high velocity flow of gas to create lift on the airfoil of the aircraft. For example, the air foil may be oblong. The main airfoil 1 of the disclosed aircraft is shown as of disk-like shape, although it may take other shapes as desired. The airfoil 1 has a smooth top surface formed by a covering 2 supported upon radially arranged I-beam structures 3 (see Figure 7). At the central part of the airfoil the covering is shaped to provide a bell-shaped opening 4 which joins with a passage 5 connected to a housing 6 of a turbo-jet engine 7. This turbo-jet engine is horizontally arranged and is positioned below the rear half of the airfoil. The turbo-jet engine may be of any desired design and is, therefore, only disclosed in general outline in Figure 3. As is well known, the turbo-jet engine embodies a compressor, a combustion chamber and a forward turbine from which hot gases flow at a high velocity through the exhaust nozzle 8. This exhaust nozzle is arranged to be adjacent the passage 5 leading to the bell-shaped opening 4 in the airfoil so that the exhausted gases will pass out through the bell-shaped opening. At the rear end of the turbo-jet engine is the air intake opening 9. The incoming air is compressed by the compressor and has mixed therewith fuel from jets 10, said fuel being supplied through a line 11 from the fuel storage tank 12. The compressed air and fuel then passes into the combustion chamber and from there through the turbine and out the exhaust nozzle.

Beneath the forward half of the airfoil is the operator's compartment 13, the frame of which is suitably joined to the central part of the aircraft through which the passage 5 extends. Suitable supporting structures 14 are employed to join the housing of the turbo-jet engine and the frame structure of the operator's compartment to the reinforcing beam structures 3 of the main airfoil 1, thus providing a rigid structure for the entire aircraft.

Associated with the mouth of the bell-shaped opening 4 in the central portion of the main disk airfoil is a diffuser ring 15 of a general inverted cone shape so that the apex of the cone extends downwardly into the bell-shaped opening 4. The diffuser ring is held in proper spaced relation to the bell-shaped opening by means of supports 16 which extend through the disk covering and are joined to the radially extending beam structures 3. The conical surface of the diffuser ring is curved from the apex outwardly and with this surface of the diffuser ring spaced from the surface of the bell-shaped opening 4, the gases coming from the exhaust nozzle of the turbo-jet engine will be directed outwardly in all directions, thereby causing these gases to flow radially over the top surface of the airfoil 1 and to the periphery thereof. The flow of these gases in the radial direction over the airfoil from the central portion thereof will result in a decrease in the pressure which will be acting downwardly on the top surface of the airfoil. This decrease in pressure will thus cause to be established a differential pressure between the pressures effective upon the top of the airfoil and that on the bottom of the airfoil, which differential pressure will act upwardly. The result will be that lift will be given to the airfoil which has been given the name of reaction lift. The greater the velocity of the gases flowing over the upper surface of the airfoil, the greater will be the lift as the increasing velocity will cause a decreasing pressure above the top surface of the airfoil and consequently a greater differential pressure acting upwardly on the airfoil. The velocity of the gases will be controlled by controlling the turbo-jet engine and the velocity of the gases which are exhausted from the exhaust nozzle.

In order that the aircraft may be given additional lift, besides that which is created on a main airfoil by the high velocity flow of gases thereover, there is provided an auxiliary airfoil 17 which is annular in form. This auxiliary airfoil has a curved cross section with the top surface of the airfoil having a general convex surface and the bottom of the airfoil having a somewhat concave surface. The auxiliary airfoil is supported from the main airfoil by extensions 18 from the main airfoil reinforcing beam structures 3. The leading edge 19 of the auxiliary airfoil is arranged to be positioned above the peripheral edge of the top surface of the main airfoil so that this leading edge will be in the path of flow of gases moving radially outwardly over the main airfoil as directed by the diffuser ring. With this arrangement of the auxiliary airfoil, it is seen that an additional lift will be obtained on the aircraft. The auxiliary airfoil will act in the same manner to provide lift as the wing of a conventional aircraft which is being moved through air by propeller thrust. Movement of the hot gases over the top surface of the curved auxiliary airfoil will decrease the downward pressure effective on the said top surface and the flow of gases against the bottom surface of the auxiliary airfoil will create an upward component force resulting in lift on the aircraft.

With the aircraft structure just described, it will be seen that a lift will be created on the aircraft which will cause it to move vertically off the ground so that it can be in flight. In order that the aircraft, after being vertically lifted off the ground and placed in flight, may have its movement controlled in directions other than the vertical, means are provided for varying the lift which will be effective on diametrically opposite portions of the auxiliary airfoil. This is accomplished by providing flaps 20, 21, 22 and 23. The flaps, which are shown as four in number, are arranged to be 90 degrees apart on the auxiliary airfoil with the flaps 20 and 22 diametrically opposed and the flaps 21 and 23 diametrically opposed. Each of the flaps is placed in suitable eliminated portions of the auxiliary airfoil and have the same cross sectional shape as the airfoil. Each flap on its inner edge is pivoted to the airfoil so that its trailing edge can be moved upwardly or downwardly into the flow of hot gases across the bottom and top of the auxiliary airfoil.

In controlling the aircraft it will be necessary to control opposing flaps differentially. Thus flaps 20 and 22 will be controlled at the same time and in opposite directions, and similarly flaps 21 and 23 will be controlled simultaneously in opposite directions. If the flap 20 is swung upwardly and the opposing flap 22 is swung downwardly, this will change the lift which is effective on diametrically opposite portions of the auxiliary airfoil. Consequently there will be a horizontal component of forces effective on the aircraft due to the difference in lift on opposite sides of the axis of the auxiliary airfoil which will result in the plane moving in the horizontal direction in which the component is effective. Thus if flap 20 should be turned downwardly and flap 22 should be turned upwardly, a greater lift will be present on the side of the auxiliary airfoil having the flap 20 and due to this greater lift the aircraft will move in the direction of the side on which the flap 22 is situated, which side will be considered the forward side of the aircraft since this is the side on which the pilot's compartment is situated. If it is desired to have the aircraft go in the opposite direction, then the flap 20 will be turned downwardly and flap 22 will be turned upwardly. In a similar manner the aircraft can be moved sideways in the direction upon which the flap 21 is situated or in the direction upon which the flap 23 is situated merely by controlling these flaps simultaneously and in opposite directions. Any other direction can also be obtained by a combination control of the four flaps. Thus if it should be desired to go in a direction which lies between flaps 21 and 22, these flaps can be turned upwardly and the flaps 20 and 23 can be turned downwardly. If the upward turning of the flaps 21 and 22 are equal, the direction of movement of the aircraft will be at a 45 degree angle to the longitudinal axis of the plane which is considered to be that axis passing through the vertical axis of the plane and in line with the turbo-jet engine and the operator's compartment.

To control the flaps there is provided, as shown in Figure 4, a double acting fluid motor 24 for each flap, which motor will be mounted on the outer end of a reinforcing beam 3. This motor 24 has a piston 25 movable in a cylinder 26. A piston rod 27 connects the piston to an arm 28 extending downwardly from the flap adjacent its hinged end. The four motors for the four flaps are actuated from the operator's compartment by a universally pivoted control stick 29 and four hydraulic compressors 30, 31, 32 and 33 as shown in Figures 4 and 5. The compressors 30 and 32 are employed to control the motors 24 of the flaps 20 and 22 and to accomplish this the compressor 30 is connected by a conduit 34 to the inner end of the motor 24 controlling the flap 20 and by a conduit 35 to the outer end of the fluid motor 24 controlling the flap 22. The compressor 32 is connected by a conduit 36 to the outer end of the fluid motor 24 controlling the flap 20 and by a conduit 37 to the inner end of the fluid motor controlling the flap 22. In a similar manner the fluid motors for the flaps 21 and 23 will be connected to the compressors 31 and 33. Thus the conduit 38 will lead from compressor 31 to the inner end of the fluid motor of the flap 21 and a conduit 39 will lead from the compressor 31 to the outer end of the fluid motor connected to the flap 23. The fluid motor 33 has a conduit 40 connected to the outer end of the fluid motor of the flap 21 and conduit 41 connected to the inner end of the fluid motor of the flap 23.

The compressors are arranged to be actuated in pairs by the control stick, or all to be actuated simultaneously, and to accomplish this the control stick at its lower end is connected by linkage 42 and 43 to the compressors 33 and 31 which are on opposite sides of the lower end of the stick. The lower end of the stick is arranged to be movable laterally in a member 44 and this member is connected by linkage 45 and 46 to the opposed compressors 30 and 32. The connecting linkage for each compressor embodies a universal joint so as to permit the compressors to be operated by moving the control stick in any direction other than directly toward a compressor, all of which will be obvious from the drawings.

If it should be desired to move the aircraft forward, the upper end of the control stick will be moved forwardly and consequently the forward flap 22 will be moved upwardly and the rear flap 20 moved downwardly. As already mentioned, this control of the flaps will result in a forward movement of the aircraft. By moving the control stick rearwardly the aircraft will move in a rearward direction since then the forward flap 22 will be moved downwardly and the rear flap 20 will be moved upwardly. When the control stick is moved in the direction of the flap 23, the flaps 23 and 21 will be so controlled that the aircraft will move in the direction from its axis which the flap 23 is located. The aircraft will move in the opposite direction when the control stick is moved toward the flap 21.

In order to move the aircraft around its vertical axis at any time, two torque rudders 47 and 48 are employed. These rudders are pivoted beneath the auxiliary airfoil and on diametrically opposite sides of the axis and are arranged to extend beyond the outer edge of the auxiliary airfoil so as to be in the slip stream of the air as it flows off from the auxiliary airfoil. As shown in Figure 6, the two torque rudders can be controlled by two pedals 49 and 50. The rudder 47 has a control shaft 51 from the inner end of which extends arms 52 and 53. Similarly the rudder 48 has an operating shaft 54 from the inner end of which extends arms 55 and 56. The arms 52 and 55 of the two rudders are connected together by a flexible cable 57 which runs over suitable pulleys 58. The other two arms 53 and 56 of the two rudders are connected by a cable 59 which runs over pulleys 60. The cable 59 is arranged to pass through the operator's compartment and has connected thereto the pedals 49 and 50 as shown in Figure 6. If it should be desired to swing the rudder 48 forwardly and the rudder 47 rearwardly, the pedal 49 will be pushed and when it is desired to swing the rudders in the opposite directions the pedal 50 will be pushed. When the rudder 48 is swung forwardly and the rudder 47 rearwardly, forces will be effective on these rudders to cause the aircraft to be moved about its axis in a counter-clockwise direction as viewed from the top. When the rudders are moved in the opposite directions the aircraft will be moved about its vertical axis in a clockwise direction. With this rudder arrangement the operator can readily rotate the aircraft in any direction about its vertical axis so that the pilot's compartment can be on the side of the aircraft corresponding to the direction in which it is desired to move the aircraft by operating the control stick.

The aircraft is provided with suitable landing wheels 61 shown in the drawings as being four in number. The wheels are connected to the frame portion of the aircraft by struts 62. The wheels will be employed primarily in moving the aircraft on the ground, since in landing the aircraft it can be brought down vertically in the same manner as a helicopter.

In the aircraft just described, it will be necessary to make the main airfoil and auxiliary airfoil, together with the passage 5 and the diffuser ring, out of material which will not be affected by the hot gases coming from the exhaust nozzle of the turbo-jet engine. If there should be too great a heat transfer at any point in the path of travel of the hot gases, suitable insulation can be provided.

In place of using a turbo-jet engine as the source means for obtaining a flow of gas at a high velocity over the airfoils, it is possible that a propeller and internal combustion engine can also be employed. Such an arrangement is shown in Figures 8 and 9. In this aircraft structure the main airfoil 1', instead of being provided with a central bell-shaped opening, is formed with a central, somewhat cone-shaped, surface 63 at the top of which is a propeller 64 rotating on a vertical axis. The surface 63 is curved so that the movement of air created by the rotating propeller will be directed to flow outwardly in a radial direction over the top surface of the main airfoil 1'. The propeller is driven by an internal combustion engine 65 which is positioned below the main airfoil, with its drive shaft 66 extending upwardly through the cone-shaped central part of the main airfoil and on the upper end of which is the propeller 64. The engine is shown as of the vertically mounted type, but it could be of the horizontal type with a suitable drive connection to the vertical propeller shaft. The operator's compartment 15' is rigidly connected to the main airfoil 1' by suitable frame structure 67. This frame structure is also employed to rigidly mount the engine below the main airfoil. The fuel tank 68 is placed beneath the rear side of the main airfoil. Landing wheels 69 are provided for landing purposes and moving the aircraft on the ground.

The main airfoil 1' has associated with it an auxiliary airfoil which is shown as identical with the auxiliary airfoil employed in the aircraft shown in Figures 1 to 7, inclusive. This airfoil is indicated by the same reference character previously employed, as are the various controls which have already been described.

The operation of the aircraft shown in Figure 8 will be similar to the first described aircraft employing the turbo-jet engine. In place of the hot gases moving over the main airfoil, the propeller will cause air to flow at a high velocity over the top surface of the main airfoil. This movement of air will result in an upwardly acting differential pressure on the main airfoil which will give lift to the aircraft. The amount of lift will be dependent upon the velocity of the air which is caused to be moved by the rotating propeller. In addition to the lift obtained by the moving of air at a high velocity over the top surface of the main airfoil, there will be some lift from the propeller thrust. If an objectionable torque reaction should be present from the single propeller, two propellers can be employed with their rotation being opposed. The movement of the air across the top and bottom surfaces of the auxiliary airfoil will also result in added lift on the aircraft. In order that the engine may be properly cooled, some of the air being moved by the propeller can be allowed to pass through air cooling ducts 70 in the curved surface 63 of the main airfoil 1'. The air will then move downwardly over the engine and give the desired cooling action.

Being aware of the possibility of modifications of the particular aircraft disclosed as embodying the principles of my invention involving reaction lift, it is not intended that the scope of the invention be limited except in accordance with the appended claims. As already mentioned, the shape of the main airfoil may be other than circular. Also, the auxiliary airfoil need not be continuous about the main airfoil. The airfoil structure may be relatively thick and house both the engines and the pilot's compartment. It is also possible to employ the reaction lift principle as a source of lift at low speeds and for taking off and landing and combine with it known types of forward propulsion means. In such arrangements the aircraft, during flight, would be maintained in the air primarily by the reaction lift principle.

What is claimed is:

1. An aircraft comprising a main airfoil, means mounted on the aircraft for producing a flow of gas at a high velocity, and means for directing said flow of gas so that it will pass over the top surface only of the airfoil and in a direction conforming with the top surface of said airfoil, an auxiliary airfoil, said auxiliary airfoil being positioned to have its leading edge in the path of flow of the gas so that the gas will flow over both surfaces thereof, a pivoted flap forming a part of the auxiliary airfoil, and means for controlling the flap.

2. An aircraft comprising a main airfoil, means mounted on the aircraft for producing a flow of gas at a high velocity, means for directing said flow of gas in outwardly radial directions from the central portion of the airfoil and directly over the top surface only thereof, auxiliary airfoil means adjacent the marginal edge of the first named airfoil and positioned to have its leading edge in the path of the flow of gas, two pivoted flaps forming a part of the auxiliary airfoil and being positioned in different radial directions from the central part of the main airfoil, and means for swinging the flaps simultaneously in opposite directions.

3. An aircraft comprising a disk-like airfoil, means mounted on the aircraft for producing a flow of gas at a high velocity, means for directing said flow of gas radially outwardly in all directions from the central portion of said airfoil and directly over the top surface only thereof, an auxiliary annular airfoil adjacent the periphery of the disk-like airfoil and positioned to be in the path of the flow of gas, diametrically positioned rudders positioned to be subject to airflow outside the periphery of the auxiliary airfoil, and means for controlling the rudders.

4. An aircraft comprising an airfoil, means mounted on the aircraft for producing a flow of gas at a high velocity, means for directing said flow of gas in outwardly directions from the central portion of the airfoil and directly over the top surface only thereof, pivoted flaps mounted on opposite sides of the airfoil and each positioned to be in the path of flow of the gas so that the gas can flow on opposite sides thereof, and means for swinging said flaps simultaneously in opposite directions.

5. An aircraft comprising an airfoil, means mounted on the aircraft for producing a flow of gas at a high velocity, means for directing said flow of gas in outwardly directions from the central portion of the airfoil and directly over the top surface only thereof, two pairs of pivoted flaps mounted on the aircraft with each pair being in opposed relation with respect to the central portion of the airfoil, each of said flaps having its pivoted end toward the flow of gas and positioned in said flow so that gas can pass over both surfaces, and a single operator operated means for controlling the pivotal movement of all the flaps, said last named means being capable of moving each pair of flaps simultaneously in opposite directions.

6. An aircraft comprising an airfoil, means mounted on the aircraft for producing a flow of gas at a high velocity, means for directing said flow of gas in outwardly radial directions from the central portion of the airfoil and directly over the top surface only thereof, auxiliary airfoil means adjacent the marginal edge of the first named airfoil and positioned to have its leading edge in the path of the flow of gas, pivoted flap means mounted in the auxiliary airfoil on opposite sides of aircraft, and means for swinging said flaps simultaneously in opposite directions from the plane of the auxiliary airfoil.

7. An aircraft comprising a disk-like airfoil, a turbo-jet engine mounted beneath the airfoil, means for conducting the hot exhaust gases to the central portion of the airfoil and directing such in outward radial directions over the top surface of said airfoil, an auxiliary airfoil surrounding the disk-like airfoil and positioned to have its leading edge in the path of the gases, pivoted flaps associated with the auxiliary airfoil, and means for controlling the flaps at will.

IRVING M. HOGLIN.

REFERENCES CITED

The following references are of record in the file of this patent:

UNITED STATES PATENTS

| Number | Name | Date |
|---|---|---|
| 1,104,542 | Porter | July 21, 1914 |
| 1,353,955 | Hering | Sept. 28, 1920 |
| 2,014,051 | Nishi | Sept. 10, 1935 |
| 2,108,652 | Coanda | Feb. 15, 1938 |
| 2,468,787 | Sharpe | May 3, 1949 |

FOREIGN PATENTS

| Number | Country | Date |
|---|---|---|
| 29,364 | Great Britain | of 1911 |
| 348,617 | France | Feb. 15, 1905 |